United States Patent [19]

de Lange

[11] Patent Number: 5,023,761
[45] Date of Patent: Jun. 11, 1991

[54] LIGHTED COOKING UTENSIL HOLDER ACCESSORY

[76] Inventor: Raymond D. de Lange, 2218 Place Rebecca Ln. #12, Houston, Tex. 77090

[21] Appl. No.: 610,391

[22] Filed: Nov. 7, 1990

[51] Int. Cl.⁵ .............................................. B25B 23/18
[52] U.S. Cl. ................................................... 362/120
[58] Field of Search ........................ 362/119, 120, 109

[56] References Cited

U.S. PATENT DOCUMENTS

| | | | |
|---|---|---|---|
| 2,158,970 | 5/1939 | Stowell | 362/120 |
| 2,358,576 | 9/1944 | Jackell | 362/119 |
| 2,376,448 | 5/1945 | Neugass | 362/120 |
| 2,673,284 | 3/1954 | Henderson | 362/120 |
| 2,706,769 | 4/1955 | Cook | 362/120 |
| 2,773,974 | 12/1956 | Markett | 362/120 |
| 3,185,832 | 5/1965 | Nagamori | 362/120 |
| 3,603,782 | 9/1971 | Wortmann | 362/120 |
| 3,839,793 | 10/1974 | Crapio | 362/109 |
| 4,348,715 | 9/1982 | Christensen et al. | 362/109 |
| 4,896,253 | 1/1990 | Southworth | 362/109 |

*Primary Examiner*—Carroll B. Dority
*Attorney, Agent, or Firm*—John R. Flanagan

[57] ABSTRACT

A lighted cooking utensil holder accessory includes an elongated hand grip having a longitudinal axis and a hollow interior cavity disposed between opposite ends of the hand grip for receiving and supporting an electric battery. The holder accessory also has a utensil socket and a light socket disposed in a collar mounted at a forward end of the hand grip. The utensil socket is mounted offset to one side of the longitudinal axis of the hand grip and forwardly of the light socket for receiving and mounting a coupling end of a shaft of a cooking utensil also having an opposite working end. The light socket is mounted generally symmetrical about the longitudinal axis of the hand grip and configured for receiving and positioning the light bulb to direct a beam of light along the longitudinal axis of the hand grip, adjacent the utensil shaft, and toward the working end of the utensil so as to illuminate the food at the working end of the utensil. The holder accessory further includes a switch mounted on the hand grip for electically connecting the light socket and the battery cavity. The switch is operable for switching on and off the supply of electrical energy to the light bulb received in the light socket from the battery received in the battery cavity.

20 Claims, 3 Drawing Sheets

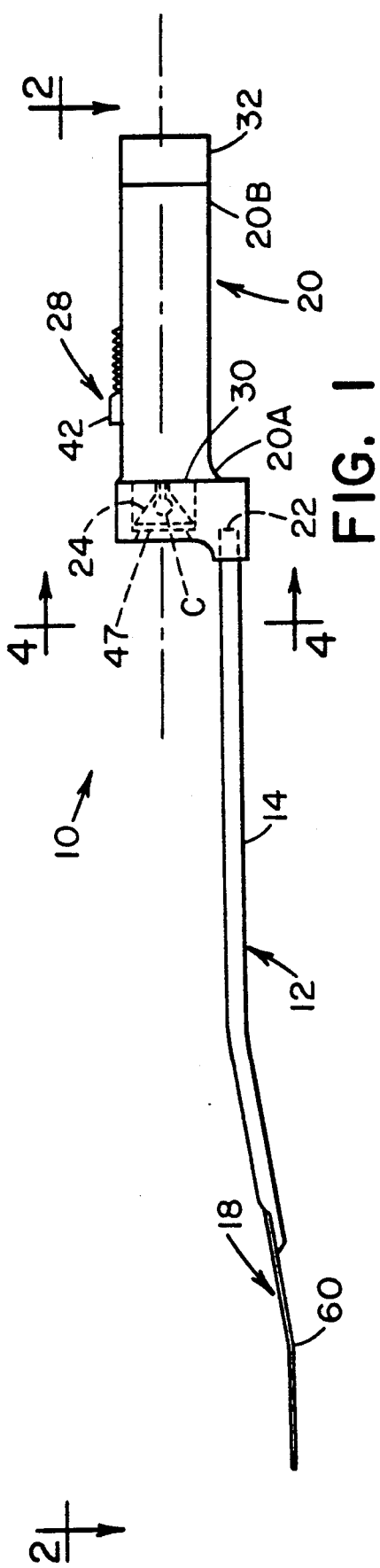
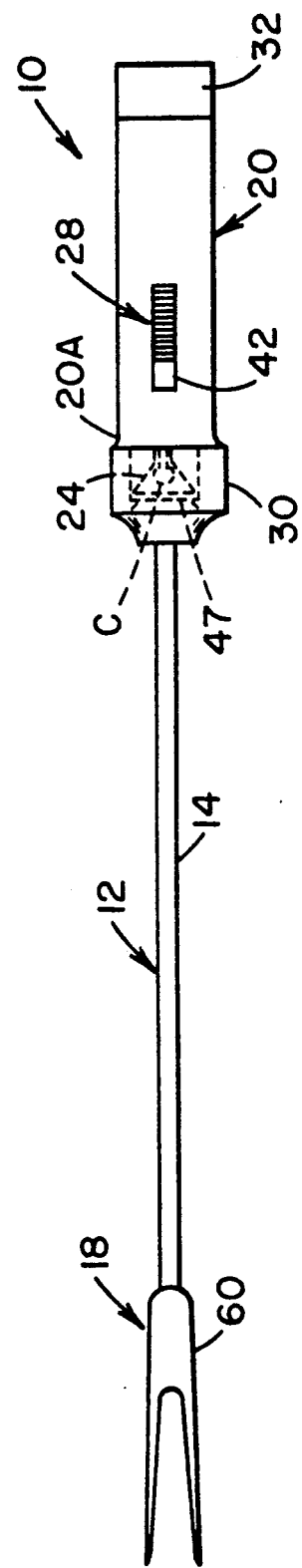
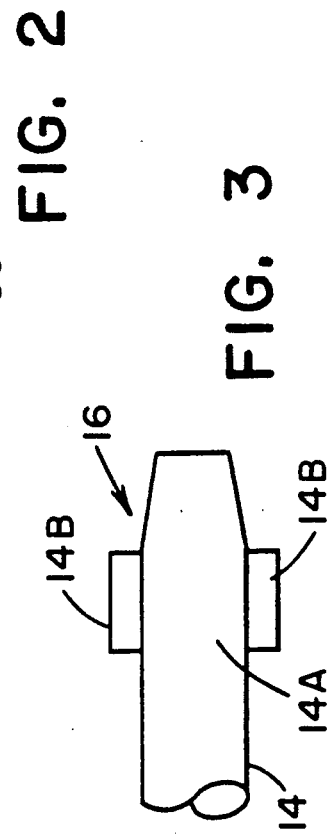
FIG. 1
FIG. 2
FIG. 3

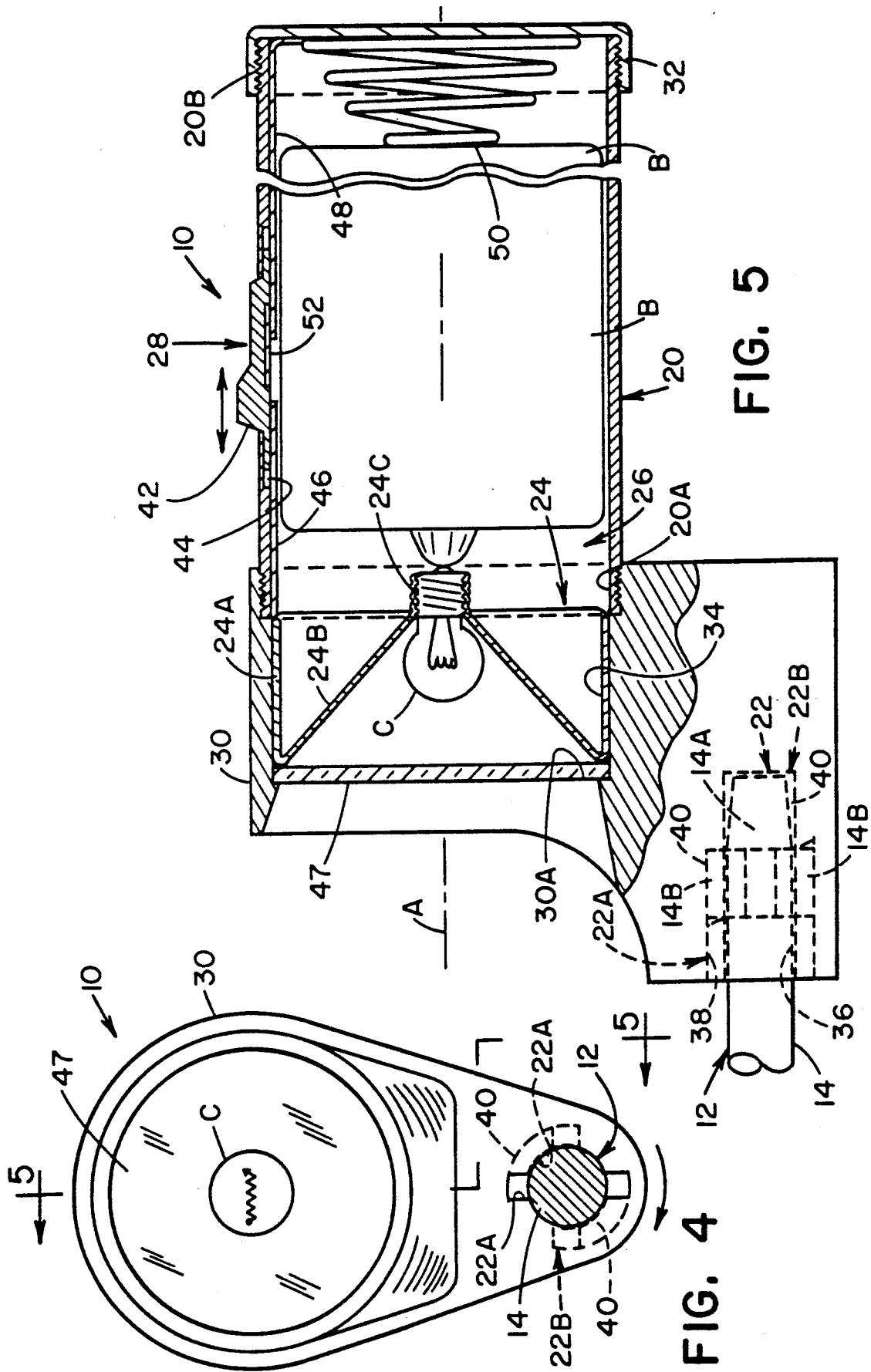

5,023,761

LIGHTED COOKING UTENSIL HOLDER ACCESSORY

BACKGROUND OF THE INVENTION

1. Field of the Invention

The present invention generally relates to outdoor cooking equipment and, more particularly, is concerned with a lighted cooking utensil holder accessory.

2. Description of the Prior Art

Patio barbecues are a tradition enjoyed by groups and families throughout the United States, especially in the Southern states. Statistics revealing the high number of households owning outdoor grills confirm this fact.

Barbecues typically take place in late afternoon or evening around the time when an evening meal is normally served. In view that barbequeing is carried out outdoors after dusk lighting must be provided to illuminate the area where the grill is located. Lanterns and floodlights are some of the lighting devices used to provide general illumination of the area. Also, in many instances, the outdoor grill is deployed adjacent the patio door or a window where interior house lighting will partially illuminate the patio area.

These prior art practices, while providing general lighting of the patio area, fail to adequately illuminate the food itself as it is being barbecued on the grill. As a result, the person performing the barbequeing task has to do a lot of guessing as to whether or not the food, typically meat, has been cooked the desired degree. Thus, the important sense of sight that is crucial to monitoring and controlling any cooking task is typically under-utilized in outdoors barbequeing because of inadequate lighting, with the result that the success or failure of the barbecue is often left to chance.

Consequently, a need exists for an easy and convenient way in which to illuminate the food being barbecued.

SUMMARY OF THE INVENTION

The present invention provides a lighted cooking utensil holder accessory designed to satisfy the aforementioned needs. The holder accessory has a hand grip with a utensil socket and a light socket in a front portion thereof. The light socket receives a light bulb and positions the bulb to direct light along a shaft of any one of a number of different cooking utensils which can be employed with the holder accessory so as to project the light on food located at the working end of the utensil.

Accordingly, the present invention is directed to a lighted cooking utensil holder accessory which includes an elongated hand grip having a forward end and a hollow interior cavity for receiving and supporting at least one electric battery, a utensil socket and a light socket disposed at the forward end of the hand grip, and means mounted on the hand grip for turning "on" and "off" a light bulb mounted in the light socket. The light socket is disposed on the forward end of the hand grip in communication with the interior cavity of the hand grip.

The utensil socket is disposed on the forward end of the hand grip offset from one side of a central longitudinal axis of the hand grip and spaced from and forwardly of the light socket and the hollow cavity. The utensil socket is capable of receiving and mounting a coupling end of a shaft of a cooking utensil that has an opposite working end. The light socket is mounted in concentric symmetrical relation about the longitudinal axis of the hand grip and is configured for receiving and positioning the light bulb to make contact with the battery in the interior cavity of the hand grip and to direct a beam of light along the utensil shaft and toward the working end of the utensil so as to illuminate food located adjacent the working end of the utensil. The switching means mounted on the hand grip is a switch coupled in electrical series with the interior cavity and the light socket for switching "on" and "off" a supply of electrical energy from the battery when mounted in the interior cavity to the light bulb when mounted in the light socket.

More particularly, the utensil socket includes an outer guide portion composed of a central passage and a pair of circumferentially spaced radial passages communicating with and disposed on opposite sides of the central passage for receiving the coupling end of the utensil shaft and a pair of lugs formed thereon. The utensil socket also includes an inner lock portion composed of a pair of arcuate recesses aligned in communication with the central and radial passages of the outer guide portion for receiving the coupling end and lugs of the utensil shaft and permitting rotation and locking of the utensil shaft in the recess.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of a lighted cooking utensil holder accessory of the present invention with a cooking utensil mounted thereto.

FIG. 2 is a top plan view of the holder accessory as seen along line 2—2 of FIG. 1.

FIG. 3 is an enlarged fragmentary view of a rear coupling end of a shaft of the utensil cooking employed with the lighted holder accessory of FIG. 1.

FIG. 4 is a front elevational view of the holder accessory as seen along line 4—4 of FIG. 1.

FIG. 5 is an enlarged side elevational view, with portions foreshortened, cutaway and sectioned, of the holder accessory as seen along line 5—5 of FIG. 4.

DETAILED DESCRIPTION OF THE INVENTION

Figure 6:
FIG. 6 is a side elevational view of a spatula utensil which can be employed with the holder accessory of FIG. 1.

In the following description, like reference characters designate like or corresponding parts throughout the several views of the drawings. Also in the following description, it is to be understood that such terms as "top", "bottom", "front", "rear" and the like, are words of convenience and are not to be construed as limiting terms.

Referring to the drawings, and particularly to FIGS. 1 and 2, there is illustrated a lighted cooking utensil holder accessory of the present invention, being generally designated 10. A cooking utensil 12, such as a fork utensil, is shown employed with the lighted holder accessory 10. The cooking utensil 12 has an elongated shaft 14 with a mating, or coupling, structure 16, as seen in greater detail in FIG. 3, defined at one end and a working structure 18, i.e., a fork, disposed at the other end. In the illustrated embodiment, the coupling structure 16 includes the solid cylindrical end portion 14A of the shaft 14 with a tapered end, and a pair of lugs 14 B spaced from one another circumferentially o approximately 180° and projecting radially outwardly at diametrically opposite locations on the shaft end portion 14B.

In its basic components, the holder accessory 10 includes an elongated hand grip 20 with a utensil socket 22 and a light socket 24 located in a forward portion of the hand grip 20. The hand grip 20 has a longitudinal central axis A and a hollow interior cavity 26 which is open at the opposite ends 20A, 20B of the hand grip. The holder accessory 10 also includes an electrical switch 28 mounted on the hand grip 20.

Referring to FIGS. 1, 2 and 4, the holder accessory 10 also includes a collar 30 removably mounted to the forward end 20A of the hand grip 20 and an end cap 32 removably mounted to the rearward end 20B of the hand grip 20 for opening and closing the interior cavity 26. As illustrated, preferably the collar 30 and end cap 32 are threadably connected to the respective opposite ends 20A, 20B of the hand grip 20. The interior cavity 26 extends between the opposite ends 20A, 20B of the hand grip 20 for receiving and housing at least one electric battery B.

Referring to FIGS. 4 and 5, the utensil socket 22 and light socket 24 are disposed in the collar 30 mounted at the forward end 20A of the hand grip 20. The utensil socket 22 is mounted offset to one side of the longitudinal axis A of the hand grip 20 and forwardly of the light socket 24. In the exemplary embodiment illustrated in FIGS. 4 and 5, the utensil socket 22 includes an outer guide portion 22A open at the exterior of the holder accessory 10 for receiving the coupling structure 16 on the rear end of the utensil shaft 14, and an inner lock portion 22B communicating with the outer guide portion 22A for receiving the coupling structure 16 of the utensil shaft 14 from the outer guide portion 22A and permitting rotation and locking of the utensil shaft 14 in the inner lock portion 22B.

More particularly, the outer guide portion 22A is composed of a central passage 36 and a pair of radial passages 38 located diametrically opposite one another and circumferentially spaced 180° from one another. The radial passages 38 communicate with and are disposed on opposite sides of the central passage 36 for receiving the coupling structure 16 of the utensil shaft 14 composed of the end portion 14A and the pair of lugs 14B formed thereon. The inner lock portion 22B is composed of a pair of arcuate recesses 40 aligned in communication with the central and radial passages 36, 38 of the outer guide portion 22A and configured for permitting rotation and locking of the utensil shaft 14 once the coupling end portion 14A and lugs 14B are inserted through the central and radial passages 36, 38 of the outer guide portion 22A.

The light socket 24 is mounted in generally concentric symmetrical relation about the longitudinal axis A of the hand grip 20 and configured for receiving and positioning a light bulb C to direct a beam of light along the longitudinal axis A of the hand grip 20, along the utensil shaft 14, and toward the working structure 18 on the rear end of the utensil 12 so as to illuminate the food at that end of the utensil. More particularly, the light socket 24 is composed of an outer cylindrical mounting portion 24A which snugly fits within a central bore 34 in the collar 30 and an inner conical reflector portion 24B which is connected at its front edge with the front edge of the outer cylindrical portion 24A. The rear end of the inner conical portion 24B is a tubular segment 24C configured for threadably receiving and mounting the light bulb C. A circular lens 47 of transparent material, either glass or plastic, is provided between the forward end of the light socket 24 and a shoulder 30A formed in the collar 30 within the central bore 34.

The electrical switch 28 of the holder accessory 10 includes a switch slider 42 mounted in a slot 44 defined on the hand grip 20 and an electrical conductor 46, 48 extending in opposite directions from the switch slider 42 and electrically connecting the light socket 24 and the interior cavity 26 via the slider 42. The interior cavity 26 includes a conductive coil spring 50 attached to the end cap 32 which completes the circuit between the one conductor 48 and the battery B when the end cap 32 is threaded onto the rear end of the hand grip 20. The switch slider 42 also mounts a conductor 52 which, upon fore-and-aft sliding movement of the slider 42, is operable for switching on and off the supply of electrical energy to the light bulb C received in the light socket 24 from the battery B received in the interior cavity 26.

The hand grip 20 can be made of a durable, hard-wearing plastic material. The light socket 24 can be either plastic or aluminum. The utensil socket 22 can be molded into the collar 30 or be formed by a stainless steel insert.

Figure 7:
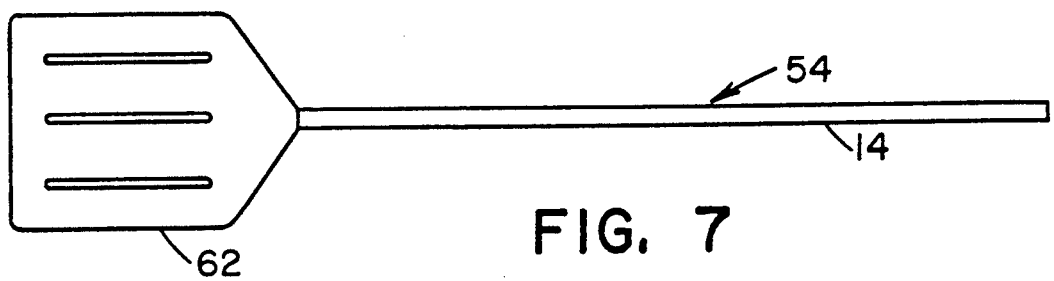
FIG. 7 is a top plan view of the spatula utensil as seen along line 7—7 of FIG. 6.
Figure 8:
FIG. 8 is a side elevational view of a knife utensil which can be employed with the holder accessory of FIG. 1.
Figure 9:
FIG. 9 is a top plan view of the knife utensil as seen along line 9—9 of FIG. 8.
Figure 10:
FIG. 10 is a side elevational view of a brush utensil which can be employed with the holder accessory of FIG. 1.
Figure 11:
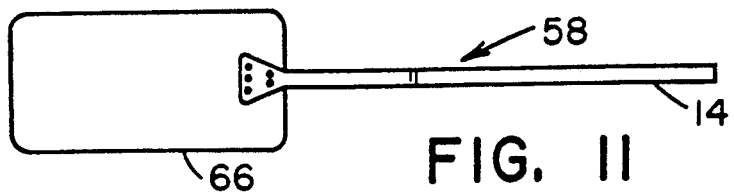
FIG. 11 is a top plan view of the brush utensil as seen along line 11—11 of FIG. 10.

The particular utensil 12 illustrated in FIGS. 1 and 2 is a fork utensil. However, any of a number of different cooking utensils, beside the fork utensil 12, can be employed with the lighted holder assembly 10. For example, the cooking utensil can be a spatula utensil 54 shown in FIGS. 6 and 7, a knife utensil 56 illustrated in FIGS. 8 and 9, or a brush utensil 58 depicted in FIGS. 10 and 11. Each of the cooking utensils has the elongated shaft 14 with the same coupling structure 16 defined at one end but a different working structure, i.e., a fork 60, a spatula 62, a blade 64, or bristles 66, at the other end.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A lighted cooking utensil holder accessory, comprising:

(a) an elongated hand grip having a forward end and a hollow interior cavity for receiving and supporting at least one electric battery;

(b) means forming a light socket on said forward end of said hand grip aligned and in communication with said interior cavity of said, hand grip;

(c) means forming a utensil socket on said forward end of said hand grip being spaced in offset relation from and forwardly of said light socket and said hollow cavity, said utensil socket being capable of receiving and mounting a coupling end of a shaft of a cooking utensil that also has an opposite working end;

(d) said light socket being capable of receiving and positioning a light bulb to make contact with the battery when mounted in said interior cavity of said hand grip and to direct a beam of light along the utensil shaft and toward the working end of the utensil so as to illuminate food located adjacent the working end of the utensil; and (e) means mounted on said hand grip being electrically coupled to said interior cavity and said light socket for switching "on" and "off" a supply of electrical energy from the battery when mounted in said interior cavity to the light bulb when mounted in said light socket.

2. The accessory of claim 1 wherein:
said hand grip has a longitudinal axis; and
said utensil socket is disposed in offset relation to one side of said longitudinal axis of said hand grip.

3. The accessory of claim 2 wherein said utensil socket includes:
an outer guide portion open at the exterior of said accessory for receiving the coupling end of the utensil shaft; and
an inner lock portion communicating with said outer guide portion for receiving the coupling end of the utensil shaft from said outer guide portion and permitting rotation and locking of the utensil shaft in said inner lock portion.

4. The accessory of claim 3 wherein said outer guide portion is composed of a central passage and a pair of circumferentially spaced radial passages communicating with and disposed on opposite sides of the central passage for receiving the coupling end of the utensil shaft and a pair of lugs formed thereon.

5. The accessory of claim 4 wherein said inner lock portion is composed of a recess aligned in communication with said central and radial passages of said outer guide portion and configured for permitting rotation and locking of the utensil shaft once the coupling end and lugs thereof are inserted through said central and radial passages of said outer guide portion.

6. The accessory of claim 2 wherein said light socket is disposed in generally concentric symmetrical relation with said longitudinal axis of said hand grip, said light socket being configured for positioning the light bulb to direct a beam of light adjacent and along said longitudinal axis of said hand grip.

7. The accessory of claim 2, wherein said means forming said light socket and said light socket and said utensil socket includes a collar mounted at a front end of said hand grip.

8. The accessory of claim 7 wherein said utensil socket includes:
an outer guide portion open at the exterior of said accessory for receiving the coupling end of the utensil shaft; and
an inner lock portion communicating with said outer guide portion for receiving the coupling end of the utensil shaft from said outer guide portion and permitting rotation and locking of the utensil shaft in said inner lock portion.

9. The accessory of claim 8 wherein said outer guide portion is composed of a central passage and a pair of circumferentially spaced radial passages communicating with and disposed on opposite sides of the central passage for receiving the coupling end of the utensil shaft and a pair of lugs formed thereon.

10. The accessory of claim 9 wherein said inner lock portion is composed of a recess aligned in communication with said central and radial passages of said outer guide portion and configured for permitting rotation and locking of the utensil shaft once the coupling end and lugs thereof are inserted through said central and radial passages of said outer guide portion.

11. The accessory of claim 7 wherein said light socket is located in said collar in generally coaxial symmetrical relation with said longitudinal axis of said hand grip, said light socket being configured for positioning a light bulb to direct a beam of light adjacent and along said longitudinal axis of said hand grip.

12. A lighted cooking utensil holder accessory, comprising:

(a) an elongated hand grip having a longitudinal axis, front and rear opposite ends, and a hollow interior cavity disposed between said opposite ends for receiving and supporting at least one battery;

(b) a collar mounted at said forward end of said hand grip;

(c) an end cap removably mounted at said rearward end of said hand grip for opening and closing said interior cavity;

(d) a utensil socket disposed in said collar offset to one side of said longitudinal axis of said hand grip, said utensil socket being capable of receiving and mounting a coupling end of a shaft of a cooking utensil that also has an opposite working end;

(e) a light socket mounted in said collar in generally concentric symmetrical relation with said longitudinal axis of said hand grip, said light socket being configured for receiving and positioning a light bulb to direct a beam of light along the longitudinal axis of said hand grip, along said utensil shaft, and toward the working end of the utensil so as to illuminate food located adjacent the working end of the utensil; and (f) means mounted on said hand grip for electrically connecting said light socket and said interior cavity and being operable for switching on and off the supply of electrical energy from the battery when in said cavity to the light bulb when in said light socket.

13. The accessory of claim 12 wherein said utensil socket includes:
an outer guide portion open at the exterior of said accessory for receiving the coupling end of the utensil shaft; and
an inner lock portion communicating with said outer guide portion for receiving the coupling end of the utensil shaft from said outer guide portion and permitting rotation and locking of the utensil shaft in said inner lock portion.

14. The accessory of claim 13 wherein said outer guide portion is composed of a central passage and a pair of circumferentially spaced radial passages communicating with and disposed on opposite sides of the central passage for receiving the coupling end of the utensil shaft and a pair of lugs formed thereon.

15. The accessory of claim 14 wherein said inner lock portion is composed of a recess aligned in communication with said central and radial passages of said outer guide portion and configured for permitting rotation and locking of the utensil shaft once the coupling end and lugs thereof are inserted through said central and radial passages of said outer guide portion.

16. In combination with a cooking utensil having a shaft with a coupling structure at one end and a working element at an opposite end, a lighted cooking utensil holder accessory, comprising:
    (a) an elongated hand grip having a longitudinal axis, a forward end and a hollow interior cavity for receiving and supporting at least one electric battery;
    (b) a light socket formed on said forward end of said hand grip aligned in concentric symmetrical relation to said longitudinal axis of said hand grip and in communication with said interior cavity of said hand grip;
    (c) a utensil socket disposed on said forward end of said hand grip being spaced in offset relation to one side of said longitudinal axis of said hand grip, said utensil socket for receiving and mounting said coupling structure of said shaft of said cooking utensil;
    (d) said light socket being capable of receiving and positioning a light bulb to make contact with the battery when mounted in said interior cavity of said hand grip and to direct a beam of light along said utensil shaft and toward said working structure of said utensil so as to illuminate food located adjacent thereto; and
    (e) means mounted on said hand grip being electrically coupled to said interior cavity and said light socket for switching "on" and "off" a supply of electrical energy from the battery when mounted in said interior cavity to the light bulb when mounted in said light socket.

17. The accessory of claim 16, wherein said utensil socket is disposed on said forward end of said hand grip and spaced in offset relation from and forwardly of said light socket and said hollow cavity.

18. The accessory of claim 16 wherein said utensil socket includes:
    an outer guide portion open at the exterior of said accessory for receiving said coupling end of said utensil shaft; and
    an inner lock portion communicating with said outer guide portion for receiving said coupling end of said utensil shaft from said outer guide portion and permitting rotation and locking of said utensil shaft in said inner lock portion.

19. The accessory of claim 18 wherein said outer guide portion is composed of a central passage and a pair of circumferentially spaced radial passages communicating with and disposed on opposite sides of the central passage for receiving said coupling end of said utensil shaft and a pair of lugs formed thereon.

20. The accessory of claim 19 wherein said inner lock portion is composed of a recess aligned in communication with said central and radial passages of said outer guide portion and configured for permitting rotation and locking of said utensil shaft once said coupling end and lugs thereof are inserted through said central and radial passages of said outer guide portion.

* * * * *